United States Patent
Satou et al.

(10) Patent No.: US 7,018,596 B2
(45) Date of Patent: Mar. 28, 2006

(54) MESOPOROUS SILICA, PROCESS FOR THE PREPARATION OF THE SAME, AND USE THEREOF

(75) Inventors: Seiji Satou, Fuji (JP); Tadashi Shimizu, Fuji (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 93 days.

(21) Appl. No.: 09/555,073

(22) PCT Filed: Nov. 19, 1998

(86) PCT No.: PCT/JP98/05223

§ 371 (c)(1),
(2), (4) Date: May 22, 2000

(87) PCT Pub. No.: WO99/26881

PCT Pub. Date: Jun. 3, 1999

(65) Prior Publication Data

US 2003/0031615 A1 Feb. 13, 2003

(30) Foreign Application Priority Data

Nov. 21, 1997 (JP) .............................................. 9-320801

(51) Int. Cl.
*C01B 37/02* (2006.01)
*B41M 5/00* (2006.01)

(52) U.S. Cl. ........................ 423/335; 423/338; 423/339; 106/482; 106/483

(58) Field of Classification Search ................. 423/335, 423/338, 339; 106/482, 483
See application file for complete search history.

(56) References Cited

U.S. PATENT DOCUMENTS

| | | | | |
|---|---|---|---|---|
| 4,464,486 A | * | 8/1984 | Kramer et al. | 521/83 |
| 4,584,070 A | * | 4/1986 | DeLue et al. | 205/352 |
| 4,879,166 A | * | 11/1989 | Misuda et al. | 428/212 |
| 5,057,296 A | * | 10/1991 | Beck | 423/277 |
| 5,622,684 A | * | 4/1997 | Pinnavaia et al. | 423/702 |
| 5,750,085 A | | 5/1998 | Yamada et al. | 423/328.2 |

FOREIGN PATENT DOCUMENTS

WO 97/32815 * 9/1997

OTHER PUBLICATIONS

"Template–based approaches to the preparation of amorphous, nanoporous silica", by Raman et al., *Chem. Mater.*, 8(8):1682–1701, 1999, no month.
"Ordered mesoporous molecular sieves synthesized by a liquid–crystal template mechanism", Kresge et al., *Nature*, 359:710–712, Oct. 1992.

* cited by examiner

*Primary Examiner*—Ngoc-Yen Nguyen
(74) *Attorney, Agent, or Firm*—Dickstein, Shaprio, Morin & Oshinsky, LLP.

(57) ABSTRACT

Accordingly, the invention provides: (1) mesoporous silica characterized by having an average pore diameter in the mesopore region of from 1.5 to 10 nm, a nitrogen adsorption specific surface area determined by the BET method of from 500 to 1400 $m^2/g$, and a monolayer adsorption of water at 25° C. of 1.7 $H_2O$ molecules/$nm^2$ specific surface area or more; (2) a process for synthesizing the mesoporous silica characterized by mixing and reacting active silica with a neutral template and removing the neutral template from the thus formed complex; (3) ink absorbents characterized by containing mesoporous silica; (4) ink absorbent slurries composed of the above-described ink absorbent and a solvent; and (5) recording sheets characterized by containing the above-described ink absorbent.

42 Claims, 3 Drawing Sheets

MESOPOROUS SILICA, PROCESS FOR THE PREPARATION OF THE SAME, AND USE THEREOF

TECHNICAL FIELD

This invention relates to mesoporous silica, a process for synthesizing the mesoporous silica, ink absorbents containing the mesoporous silica which are to be used in ink-jet recording sheets, etc. and the recording sheets.

BACKGROUND ART

Mesoporous silica, which is porous silica having uniform pores in the mesopore region of 1.5 to 10 nm, clearly shows crystallinity in the powder X-ray diffraction. It is a new material expected as widely applicable to selective catalytic reactions, adsorption/separation, etc.

Usual porous silica materials such as silica gel have hydrophilic surface. In contrast thereto, mesoporous silica has hydrophobic surface.

With respect to processes of the synthesis of mesoporous silica, there have been known, for example, the following three processes with the use of a combination of a silica source with a template. In the first process reported in U.S. Pat. No. 3,556,725, JP-W-5-503499, JP-A-8-34607, etc., the synthesis is carried out within the alkaline region by using amorphous silica powders, aqueous alkali silicate solutions, active silica, etc. as the silica source and quaternary ammonium salts having long-chain alkyl group or phosphonium salts as the template. In the second process reported in JP-A-4-238810, etc., the synthesis is carried out by the ion exchange method with the use of layered silicates like kanemite as the silica source and long-chain alkyl ammonium cations as the template. In the third process reported in U.S. Pat. No. 5,672,556, etc., alkoxides such as tetraethoxysilane are used as the silica source and alkylamines, etc. are used as the template. (The term "JP-A" as used herein means an "unexamined published Japanese patent application", and the term "JP-W" as used herein means an "published Japanese patent application in the national stage of International application".)

In the first process, the synthesis is performed within the alkaline region using a strongly cationic surfactant such as a quaternary ammonium salt as the template, so that mesoporous silica is obtained by removing the template. To remove the template, either oxidative destruction in the atmosphere or proton exchange with an acid and a solvent should be performed In the second process, it is further required to synthesize kanemite, etc. used as the starting material. Although the third process with the use of an amine is advantageous from the viewpoint of removing the template, it is inadequate for mass production on an industrial scale, since expensive alkoxides (tetraethoxysilane, etc.) should be used therein.

To synthesize mesoporous silica, therefore, it is unavoidable either to perform the reaction in the alkaline region with the use of strongly cationic surfactants (quaternary ammonium salts, etc.) as the template or to use expensive starting materials such as alkoxides. The mesoporous silica synthesized under these conditions has hydrophobic surface, which makes it disadvantageous in absorbing aqueous waters, etc.

With the spread of Internet and digital cameras, opportunities to output rich full-colored images on paper, etc. have been increasing. Ink-jet printers have been rapidly spreading as instruments for outputting these images owing to the merits thereof such as being able to easily give full-colored images, being available at a low cost, and making little noise. In the ink-jet system, ink droplets are jetted from a nozzle at a high speed and adhered to a recording material to give a record. Since droplets of ink containing much solvents are continuously jetted, there frequently arise some problems such that the ink droplets are fused with each other on a recording sheet to thereby form enlarged dots or mixtures of dots with different colors. It is therefore required that an ink-jet recording sheet can quickly absorb inks so that the inks are neither mixed with each other even in overlapping dots nor blur. It is also required that the recording sheet can keep the image to be recorded in a favorable state (i.e., having excellent water resistance, light resistance, etc.).

From these points of view, it has been proposed ink-jet recording sheets produced by applying various organic matters or inorganic matters optionally together with binders onto base materials or incorporating these matters into base materials. For example, there have been known recording sheets provided with an ink receptor layer made of a water-soluble resin (polyvinyl alcohol, etc.) on paper, a plastic film, etc. and recording sheets provided with an ink receptor layer containing a filler such as silica gel (see, for example, JP-A-55-146786, JP-A-56-99692, JP-A-59-174381, JP-A-2-276670). However, there has been obtained no recording sheet so far which is free from dot blurs, shows a high ink-absorptivity and, at the same time, has satisfactory water resistance and light resistance.

The present invention provides mesoporous silica having highly hydrophilic surface compared with the conventional ones and a process for synthesizing the mesoporous silica under mild conditions with the use of inexpensive materials.

The invention also provides ink absorbents, ink absorbent slurries and recording sheets which are free from dot blurs, have a high ink-absorptivity and are excellent in water resistance and light resistance.

DISCLOSURE OF THE INVENTION

The gists of the invention are as follows.

1. Mesoporous silica characterized by having an average pore diameter in the mesopore region of from 1.5 to 10 nm, a nitrogen adsorption specific surface area determined by the BET method of from 500 to 1400 $m^2/g$, and a monolayer adsorption of 1.7 $H_2O$ molecules/$nm^2$ specific surface area or more at 25° C.

2. A process for synthesizing mesoporous silica characterized by successively performing the step of mixing and reacting active silica with a neutral template to synthesize an active silica/neutral template complex, and the step of removing the neutral template from the complex.

3. The process for synthesizing mesoporous silica as described in the above 2, wherein the neutral template is an amine represented by the following structural formula (1):

$$RNH_2 \quad (1)$$

wherein R represents an alkyl group having 8 to 20 carbon atoms.

4. The process for synthesizing mesoporous silica as described in the above 2, wherein the neutral template is a nonionic surfactant represented by the following structural formula (2):

$$R(OCH_2CH_2)_nOH \quad (2)$$

wherein R represents an alkyl group having 12 to 20 carbon atoms; and n is from 2 to 30.

5. The process for synthesizing mesoporous silica as described in the above 2, wherein the neutral template is an amine oxide represented by the following structural formula (3):

R(CH$_3$)$_2$NO    (3)

wherein R represents an alkyl group having 8 to 20 carbon atoms.

6. The process for synthesizing mesoporous silica as described in the above 2, 3, 4 or 5, characterized in that the neutral template is removed by bringing into contact with a solvent.

7. The process for synthesizing mesoporous silica as described in the above 6, characterized in that the solvent to be used in removing the neutral template is an alcohol.

8. An ink absorbent characterized by containing mesoporous silica.

9. An ink absorbent slurry comprising the ink absorbent as described in the above 8 and a solvent.

10. A recording sheet characterized by containing the ink absorbent as described in the above 8.

11. The ink absorbent as described in the above 8 wherein the mesoporous silica is the mesoporous silica as described in the above 1.

12. An ink absorbent composed of the ink absorbent as described in the above 11 and a solvent.

13. A recording sheet characterized by containing the ink absorbent as described in the above 12.

BEST MODE FOR CARRYING OUT THE INVENTION

Figure 1:
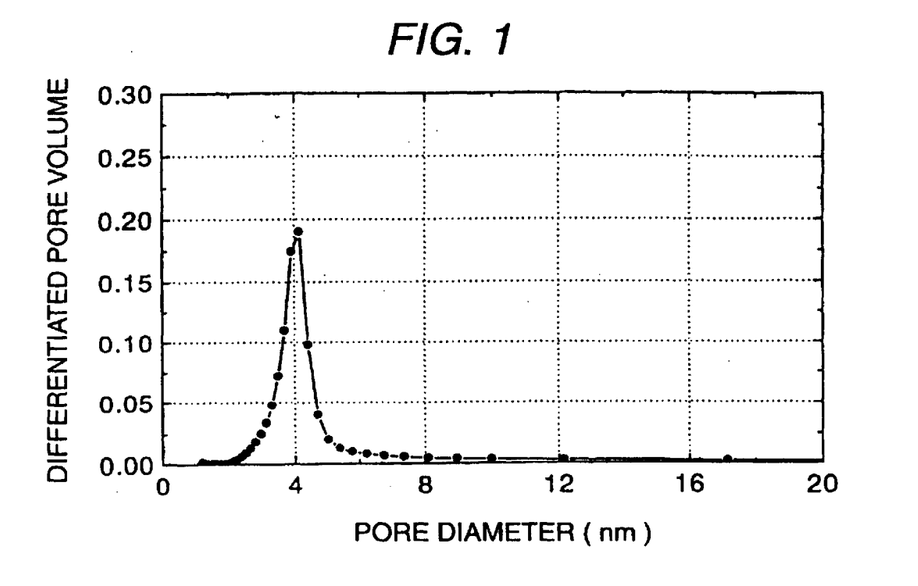
FIG. 1 is a chart showing the pore distribution of the mesoporous silica synthesized in Example 1.
Figure 2:
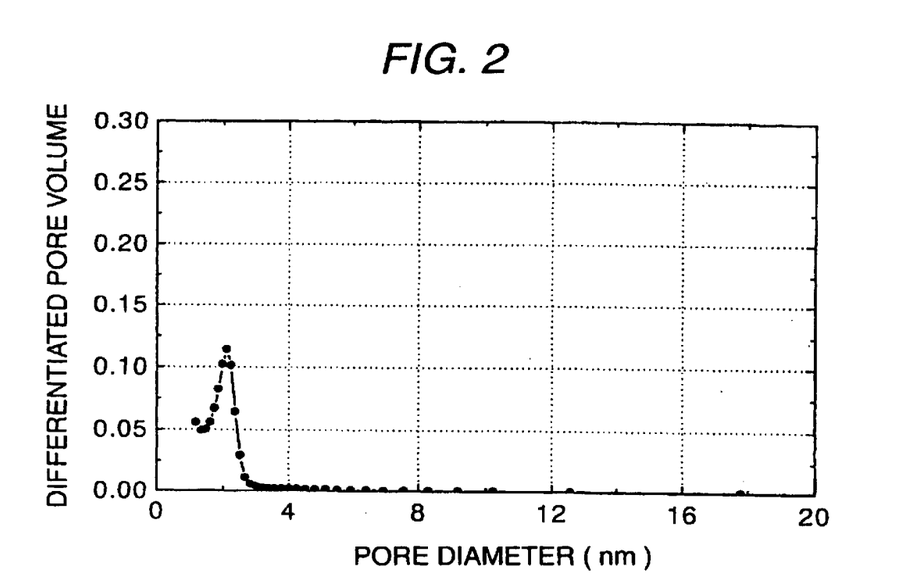
FIG. 2 is a chart showing the pore distribution of the mesoporous silica synthesized in Example 5.
Figure 3:
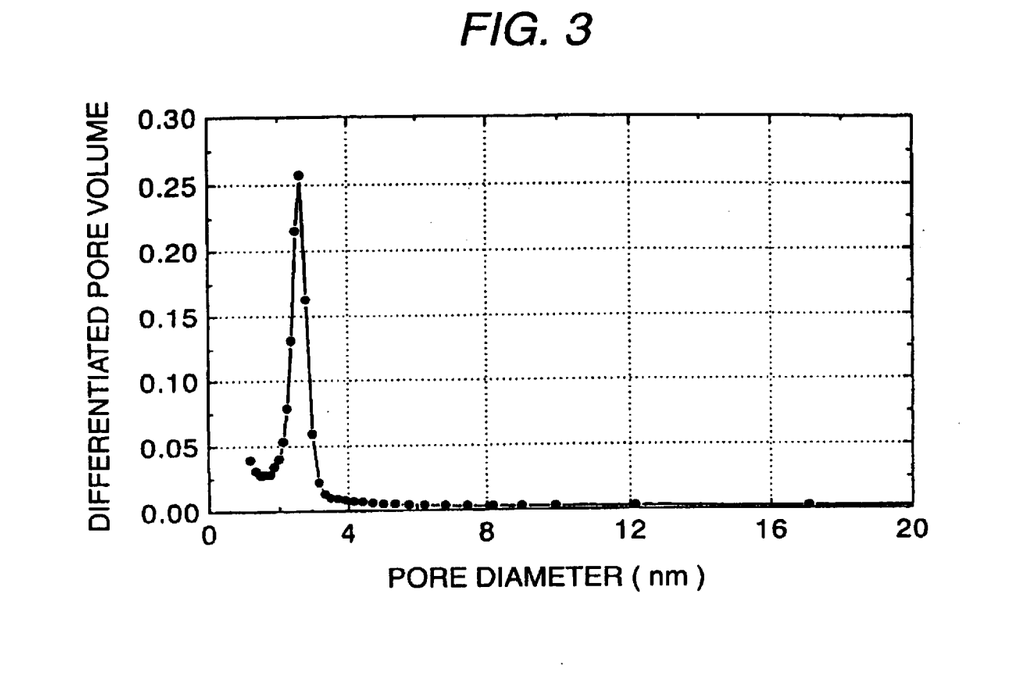
FIG. 3 is a chart showing the pore distribution of the mesoporous silica synthesized in Example 7.
Figure 4:
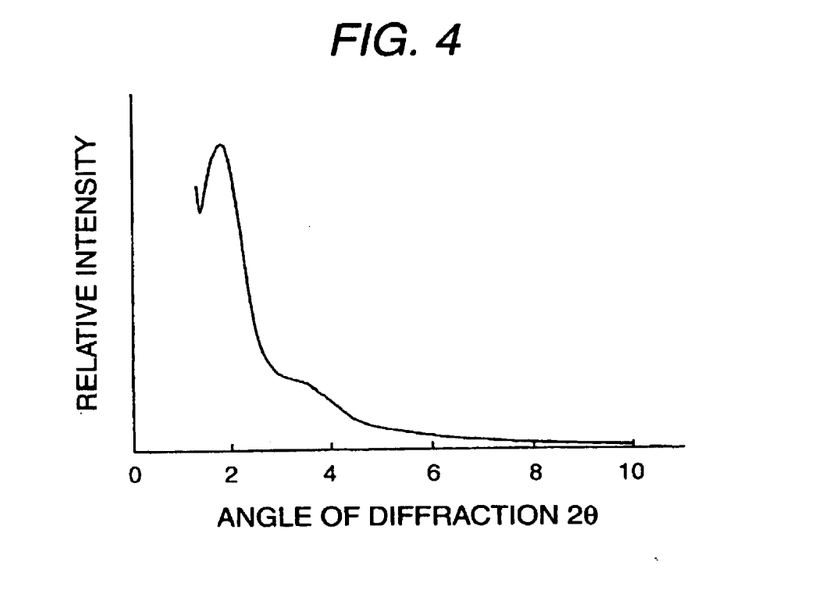
FIG. 4 is a powder X-ray diffraction pattern of the mesoporous silica synthesized in Example 1.
Figure 5:
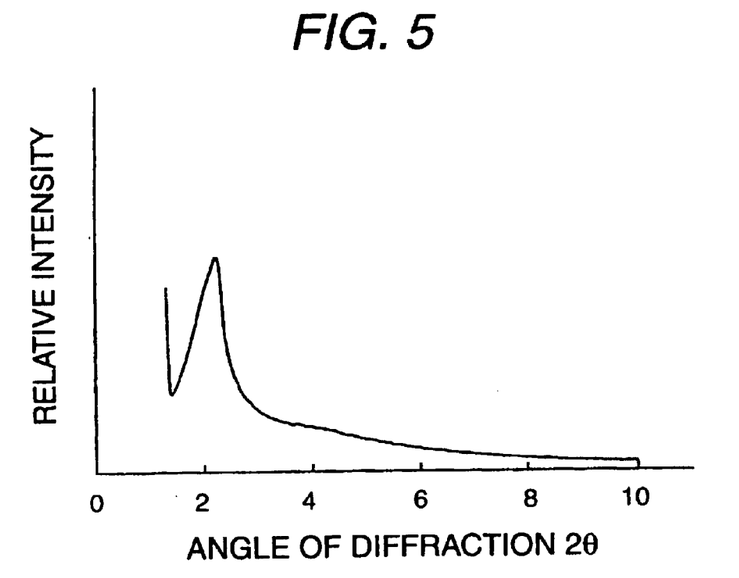
FIG. 5 is a powder X-ray diffraction pattern of the mesoporous silica synthesized in Example 5.
Figure 6:
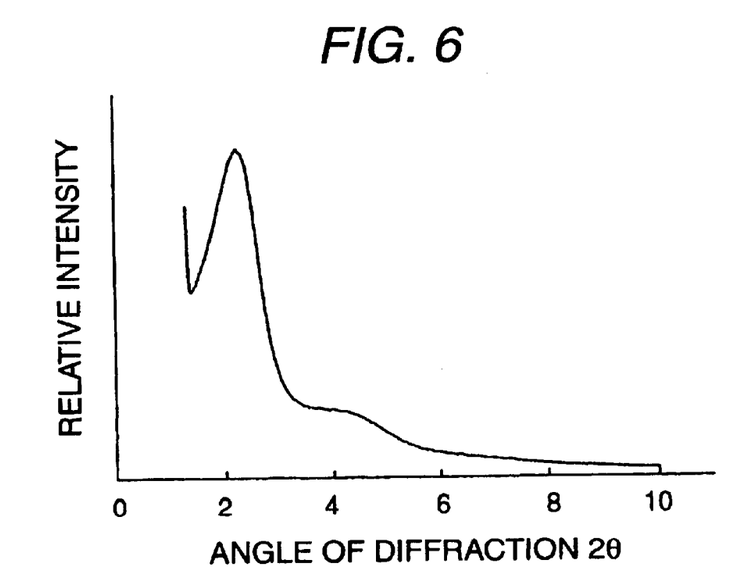
FIG. 6 is a powder X-ray diffraction pattern of the mesoporous silica synthesized in Example 7.

Now, the invention will be described in greater detail.

The mesoporous silica according to the invention is characterized by having an average pore diameter in the mesopore region of from 1.5 to 10 nm, a nitrogen adsorption specific surface area determined by the BET method of from 500 to 1400 m$^2$/g, and a monolayer adsorption of water at 25° C. of 1.7 H$_2$O molecules/nm$^2$ or more. The monolayer adsorption of water at 25° C. of 1.7 H$_2$O molecules/nm$^2$ specific surface area or more contributes to the achievement of the excellent ability to absorb aqueous solutions, etc.

The process for synthesizing mesoporous silica according to the invention is characterized by mixing and reacting active silica with a neutral template and then removing the neutral template from the complex thus obtained. The invention is also characterized in that the neutral template can be easily removed, recovered and reused by bringing into contact with an organic solvent such as an alcohol.

The active silica to be used in the invention can be prepared by being extracted from water-glass with an organic solvent or subjecting water-glass to ion exchange. When the active silica is prepared by bringing water-glass into contact with an H-type cation exchanger, for example, it is industrially preferable to use No. 3 water-glass which contains only a small amount of Na and is less expensive. In this case, the water-glass is mixed with water and then brought into contact with a cation exchange resin to give active silica. From the viewpoint of efficiency, it is favorable that the mixing ratio of the water-glass to water ranges from 0.2 to 0.6. As the cation exchange resin, it is preferable to use strongly acidic exchange resins based on sulfonated polystyrene divinylbenzene (for example, Amberlite IR-120B manufactured by Rohm & Hass Co.) etc., though the invention is not restricted thereto.

The neutral template to be used in the invention is not particularly restricted. For example, long-chain alkylamines, nonionic surfactants, long-chain alkylamine oxides and the like are may be used therefor. It is preferable to use primary amines having long-chain alkyl, nonionic surfactants of the polyethylene glycol type, dimethylalkylamine oxides, etc.

As the amines to be used in the invention, those having a structural formula RNH$_2$ (wherein R represents an alkyl group having 8 to 20 carbon atoms) are preferable. Particular examples thereof include dodecylamine, tetradecylamine, hexadecylamine, octadecylamine, etc.

As the nonionic surfactants to be used in the invention, those having a structural formula R(OCH$_2$CH$_2$)$_n$OH (wherein R represents an alkyl group having 12 to 20 carbon atoms; and n is form 2 to 30) are preferable. Particular examples thereof include polyoxyethylene lauryl ether, polyoxyethylene cetyl ether, polyoxyethylene stearyl ether, etc.

As the amine oxides to be used in the invention, those having a structural formula R(CH$_3$)$_2$NO (wherein R represents an alkyl group having 8 to 20 carbon atoms) are preferable. Particular examples thereof include N,N-dimethylundecylamine N-oxide, N,N-dimethyldodecylamine N-oxide, N,N-dimethyltetradecylamine N-oxide, etc.

The composition expressed in the molar ratio of SiO$_2$/neutral template to be used in these reaction ranges from 1 to 30, preferably from 1 to 10. When two or more templates are employed, use is made of a value expressed in the average molecular weight.

To alter the pore diameter, it is possible to further add an organic auxiliary such as aromatic hydrocarbons having 6 to 20 carbon atoms, alicyclic hydrocarbons having 5 to 20 carbon atoms, aliphatic hydrocarbons having 3 to 16 carbon atoms, and amines and halides thereof, for example, trimethylbenzene, triethylbenzene, etc. The molar ratio of the organic auxiliary/SiO$_2$ ranges from 0.05 to 20, preferably from 0.1 to 10, while the molar ratio of the organic auxiliary/template ranges from 0.02 to 100, preferably from 0.05 to 35.

Owing to the high reactivity of active silica, the reaction can easily proceed even at ordinary temperature. However, the reaction may be performed under heating up to 100° C., if necessary It is unnecessary to employ conditions exceeding 100° C. as in hydrothermal reactions. The reaction time is from 0.5 to 100 hours, preferably from 3 to 50 hours. The pH range at the reaction preferably falls within a range of from 4 to 10, still preferably from 5 to 9.

The reaction between active silica and the template can be carried out by, for example, mixing/stirring an aqueous solution of active silica, obtained by bringing water-glass into contact with an ion exchange resin, with the template dissolved or dispersed in a solvent or the template as such, though the invention is not restricted thereto. When active silica is obtained by extracting water-glass with an organic solvent, a solution of the active silica in the organic solvent is reacted with the template. When the template is to be dissolved or dispersed, use may be made of water, an organic solvent or a mixture of water with an organic solvent. As the organic solvent, alcohols are preferably employed. Preferable examples of the alcohols include lower alcohols such as ethanol and methanol. The molar ratio of the solvent/template in the reaction preferably ranges from 1 to 1,000, still preferably from 5 to 500.

The complex thus obtained is separated by filtration, etc., washed with water and dried. Next, the template contained therein is removed by bringing into contact with a solvent such as an alcohol or calcination. Thus, mesoporous silica can be obtained. Calcination is performed at such a temperature as ensuring burning-off of the template, i.e., about 500° C. or above. The calcination time is appropriately determined depending on the relationship with temperature. In general, it ranges from about 30 minutes to 6 hours. The solvent to be used in removing the template may be an arbitrary one, so long as the template is soluble therein. Although use can be made of alcohols, supercritical fluids, etc. therefor, it is preferable to use alcohols which can be easily handled and have high dissolving power. Preferable examples of the alcohols include lower alcohols such as methanol and ethanol. The template may be removed by, for example, mixing the solvent with the complex and stirring, or passing a solvent through a column packed with the complex. The removal temperature preferably ranges from 20 to 80° C., though it may vary depending on the solvent and template employed. In the process of removing the template by mixing/stirring, it is preferable that the mixing ratio by weight of solvent to the complex (i.e., the weight of the solvent/the weight of the complex) is 5 or more. When the weight ratio is excessively high, the efficiency of removing the template is elevated but the device becomes too large. When the weight ratio is lower than 5, on the other hand, a compact device can be employed but the removal efficiency is lowered. In such a case, it is therefore necessary to elevate the mixing/stirring frequency or to prolong the mixing/stirring time. The template thus removed can be reused after eliminating the solvent therefrom.

The ink absorbent according to the invention is characterized by containing mesoporous silica. The mesoporous silica to be contained in the ink absorbent of the invention is one having a porous structure with a nitrogen adsorption specific surface area determined by the BET method of preferably from 500 to 1400 $m^2/g$ (still preferably from 700 to 1400 $m^2/g$), and a pore volume of preferably from 1 to 4 cc/g. When the specific surface area is less than 500 $m^2/g$, or the pore volume is less than 1 cc/g, only an insufficient ink-absorptivity can be obtained. By using mesoporous silica which satisfies the above-mentioned requirement and further has a monolayer adsorption of 1.7 $H_2O$ molecules/$nm^2$ specific surface area or more at 25° C., the water resistance of the ink absorbent can be further elevated owing to the hydrophilic surface.

It is preferable that the average particle diameter of the mesoporous silica to be used in the ink absorbent of the invention ranges from 0.02 to 20 μm. It is not favorable that the average particle diameter is larger than 20 μm, since the smoothness of a recording sheet is sometimes worsened in this case.

The mesoporous silica to be used in the ink absorbent of the invention may be synthesized by an arbitrary process without restriction, so long as the physical properties as defined above are imparted thereby. For example, use may be made therefor of a process of synthesizing in the alkaline region with the use of an amorphous silica powder, an aqueous alkali silicate solution, active silica, etc. as the silica source and a quaternary ammonium salt having long-chain alkyl or a phosphonium salt as the template, as described in JP-W-5-503499, JP-A-8-34607, etc. Alternatively, it is possible to use a process of synthesizing by the ion exchange method with the use of a layered silicate such as kanemite as the silica source and a long-chain alkylammonium cation as the template, as described in JP-A-4-238810, etc. It is also possible to use a process with the use of an alkoxide such as tetraethoxysilane as the silica source and an alkylamine, etc. as the template, as described in U.S. Pat. No. 5,672,556. Moreover, use may be made of the synthesis processes as claimed in claims 2 to 7 of the present invention.

Although the content of the mesoporous silica in the ink absorbent varies depending on the utilization mode thereof without restriction, it is preferable that the content is 10% by weight or more, still preferably 30% by weight or more. Although other components of the ink absorbent are not particularly restricted, it may contain a binder, a pigment, and the like depending on the purpose and mode of the utilization. As the binder, use can be made of organic matters publicly known in the art, for example, starch, modifications thereof, water-soluble resins such as polyvinyl alcohol (hereinafter referred to simply as PVA) and modifications thereof, latexes and emulsions. The binder is used usually in an amount of from 5 to 300 parts by weight per 100 parts by weight of the mesoporous silica in the ink absorbent. Examples of the pigment as described above include silica gel, calcium carbonate, kaolin, zeolite, alumina, etc.

The ink absorbent may be in the form of either a powder, a mass or a paste. Namely, it is not particularly restricted in form, so long as it is usable as an ink-absorbent element to be applied onto the surface of a base material (a synthetic resin film, a paper, etc.) or incorporated thereinto.

In addition to the binder and pigment as described above, the ink absorbent may further contain other publicly known additives such as an ultraviolet absorber, a fading inhibitor, a dispersant, a thickener, a defoaming agent, etc. depending on the purpose of utilization.

In the recording sheet according to the invention, a base material (a synthetic resin film, a paper, etc.) is surface-coated with the above-described ink absorbent, which serves as an ink-absorbing element, or the ink absorbent is incorporated into the base material.

Examples of the base material usable herein include synthetic resin films and papers. As the synthetic resin films, use can be made of, for example, polyesters, polyolefins, polyamides, polyester amides, polyvinyl chloride and the like. Moreover, it is possible to use copolymers of these polymers, blends thereof, crosslinked products thereof, films opacified by incorporating pigments, foamed films, glossy films, etc. Among the base materials as cited above, it is particularly preferable to use polyester, still preferably polyethylene terephthalate, from the viewpoints of mechanical properties, handling properties, etc. As the papers, use can be made of woodfree paper, moderate-grade paper, art paper, cast-coat paper, coated paper, synthetic paper, resin-coated paper, etc. In addition to the synthetic resin films and papers, it is also possible to use fabrics (cotton, rayon, acrylic fabric, etc.), glass plates, metals, etc. as the base material depending on the purpose. The thickness of the base material ranges from 10 to 200 µm in many cases, though the invention is not restricted thereto.

To coat the surface of the base material, the ink absorbent may be applied by using various publicly known methods (die coating, roll coating, rod coating, blade coating, air knife coating, etc.) and then dried. Alternatively, use may be made of the dip coating method wherein the base material is soaked in the ink absorbent, the spray method wherein the ink absorbent is sprayed onto the base material, or the transfer method wherein a surface of a molded article is coated with the ink absorbent followed by transfer onto the base material.

In the step of coating, it is a practice to use a slurry prepared by mixing the ink absorbent with a solvent. In this case, it is also possible that a dispersion of the mesoporous silica (i.e., one of the components of the ink absorbent) and a liquid having other components (i.e., binder, etc.) dispersed therein are prepared separately and then mixed together to give a slurry for coating.

As the solvent, use may be made of various ones depending on the coating method and binder employed without restriction. Use may be made therefor of water and various publicly known organic solvents such as alcohols (ethanol, isopropyl alcohol, etc.), acetone, methyl ethyl ketone, etc. The amount of the ink absorbent varies depending on the coating method and the utilization mode without restriction. It is preferable that the ink absorbent content in the slurry is 5% by weight or more, still preferably 10% by weight or more.

If needed, the base material may be preliminarily subjected to a publicly known surface-treatment (corona discharge, primer treatment, etc.) in air or another atmosphere so as to improve the coating properties or adhesiveness of the ink absorbent. Furthermore, it is possible to employ multi-layer coating, to coat both faces of the base material, or to laminate layer(s) having different properties (a protective layer, a gloss layer, an adhesive layer, etc.) thereon.

It is appropriate that the coating thickness ranges from 1 to 100 µm, preferably from 5 to 50 µm. The content of the mesoporous silica in the coating layer preferably ranges from 0.5 to 30 g/m². When the content of the mesoporous silica is less than 0.5 g/m², it is feared that the ink-absorptivity becomes insufficient.

As a means for incorporating the ink absorbent in case of, for example, paper, the above-described ink absorbent or a slurry containing the ink absorbent is added to a paper slurry and then the resultant mixture is processed with a paper machine. Alternatively, it is also possible that the ink absorbent is mixed with a synthetic resin, etc. and the thus obtained mixture is molded into a film or a sheet by the casting method, the extrusion method, the calendering method, etc. Although the synthetic resin to be used herein is not particularly restricted, it is preferable to use therefor those having a high water permeability such as vinyl alcohol resins, acrylic resins, urethane resins, amino acid resins, etc. The content of the mesoporous silica based on the whole sheet preferably ranges from 0.5 to 30% by weight.

EXAMPLES

Now, the invention will be described in greater detail with reference to the following Examples.

In these Examples, powder X-ray diffraction patterns were formed by using RINT2500 manufactured by Rigaku.

Pore distribution and specific surface area were measured with nitrogen by using Autosorb 1 manufactured by Quantachrome. Pore distribution was calculated by the BJH method. The average pore diameter was calculated from the peak value in the differentiated pore distribution curve determined by the BJH method. Specific surface area was calculated by the BET method.

Water monolayer adsorption was calculated by dividing monolayer adsorption, which had been determined by the BET method with the use of an adsorption isotherm of water by using BELSORP 18 manufactured by Bel Japan, INC., with the BET specific surface area determined by the nitrogen adsorption Average particle diameter was measured with a laser diffraction grain size distribution meter SALD-1100 manufactured by Shimadzu Corporation.

Mesoporous silica content in ink absorbent layer was determined from the ratio of the weight of coated ink absorbent layer after drying to the weight of the mesoporous silica and binder fed into the slurry.

Example 1

An amount (172.5 g) of No. 3 water-glass ($SiO_2$=29% by weight, $Na_2O$=9.5% by weight) was diluted with 327.5 g of water and the resultant solution was passed through a column preliminarily packed with an H-type cation exchange resin (Amberlite IR-120B) to give 350 g of an aqueous solution of active silica. This aqueous active silica solution contained 8.3% by weight of $SiO_2$. An amount (10.9 g) of hexadecylamine was dissolved in 76.8 g of ethanol and then 100 g of the above-described aqueous active silica solution was added thereto under stirring. The obtained mixture had a pH value of 9. Then the mixture was reacted by allowing to stand at room temperature for 22 hours. The obtained mixture had a pH value of 9. Then the mixture was reacted by allowing to stand at room temperature for 22 hours. The complex thus obtained was filtered, washed with water and then dried at 70° C. for 18 hours to give a powder of a silica/template complex. A 3 g portion of this powder was dispersed in 30 ml of ethanol, stirred at 60° C. for 30 minutes and filtered. After repeating this procedure thrice, the dispersion was dried at 100° C. for 23 hours to give mesoporous silica. A peak (d=4.6 nm) was observed in the X-ray diffraction pattern of this sample. This sample showed a specific surface area of 780 m²/g, an average pore diameter of 4.0 nm and a water monolayer adsorption of 1.70 $H_2O$ molecules/nm² specific surface area.

Example 2

A 5 g portion of the silica/template complex obtained in Example 1 was calcinated at 550° C. in the atmosphere for 6 hours to give mesoporous silica. A peak (d=4.3 nm) was observed in the X-ray diffraction pattern of this sample. This sample showed a specific surface area of 970 m²/g, an average pore diameter of 3.9 nm and a water monolayer adsorption of 1.49 $H_2O$ molecules/nm² specific surface area.

Example 3

A silica/template complex powder was prepared as in Example 1 but using 8.34 g of dodecylamine as a substitute for hexadecylamine employed as the template. The white powder thus obtained was calcinated as in Example 2 to give mesoporous silica. A peak (d=3.6 nm) was observed in the X-ray diffraction pattern of this sample. This sample showed a specific surface area of 1020 m²/g, an average pore diameter of 2.8 nm and a water monolayer adsorption of 1.57 $H_2O$ molecules/nm2 specific surface area.

Example 4

An amount (3.0 g) of polyoxyethylene lauryl ether (Emulgen 108, manufactured by Kao Corporation) was added to 13.9 g of water and dissolved therein. Next, 50 g of the active silica prepared in Example 1 was added thereto. The obtained mixture showed a pH value of 5. Then the mixture was reacted by allowing to stand at room temperature for 22 hours. The complex thus obtained was filtered, washed with water and then dried at 70° C. for 18 hours to give a powder of a silica/template complex. The white powder thus obtained was treated with ethanol as in Example 1 to give mesoporous silica. A peak (d=4.0 nm) was observed in the X-ray diffraction pattern of this sample. This sample showed a specific surface area of 900 an average pore diameter of 2.0 nm and a water monolayer adsorption of 2.10 $H_2O$ molecules/$nm^2$ specific surface area.

Example 5

A 5 g portion of the silica/template complex obtained in Example 4 was calcinated at 550° C. in the atmosphere for 6 hours to give mesoporous silica. A peak (d=4.0 nm) was observed in the X-ray diffraction pattern of this sample. This sample showed a specific surface area of 1000 $m^2$/g and an average pore diameter of 2.1 nm.

Example 6

An amount (13.7 g) of N,N-dimethyltetradecylamine N-oxide was added as a template to 15.7 g of water and solved therein. Next, 50 g of the active silica prepared in Example 1 was added thereto. The obtained mixture showed a pH value of 5. Then the mixture was reacted by allowing to stand at room temperature for hours. The complex thus obtained was filtered, washed with water and then dried at 70° C. for 18 hours to give a powder of a silica/template complex. The white powder thus obtained was treated with ethanol as in Example 1 to give mesoporous silica. A peak (d=3.9 nm) was observed in the X-ray diffraction pattern of this sample. This sample showed a specific surface area of 1000 $m^2$/g, an average pore diameter of 2.5 nm and a water monolayer adsorption of 2.47 $H_2O$ molecules/$nm^2$ specific surface area.

Example 7

A 5 g portion of the silica/template complex obtained in Example 6 was calcinated at 550° C. in the atmosphere for 6 hours to give mesoporous silica. A peak (d=3.9 nm) was observed in the X-ray diffraction pattern of this sample. This sample showed a specific surface area of 1200 $m^2$/g and an average pore diameter of 2.6 nm.

Example 8

An amount (8.1 g) of hexadecylamine was added as a template to 70 ml of ethanol and dissolved therein. Next, 27.32 g of tetraethoxysilane was added thereto under stirring. The obtained mixture showed a pH value of 9. Then the mixture was reacted by allowing to stand at room temperature for 18 hours. The obtained complex was filtered, washed with water and air-dried for 48 hours to give a silica/template complex powder. An 8 g portion of the thus obtained white powder was dispersed in 800 ml of ethanol and stirred at 60° C. for 30 minutes. Next, it was filtered and washed by adding from top 800 ml of ethanol. After repeating this procedure twice, the mixture was dried at 70° C. for 23 hours to give mesoporous silica. A peak (d=4.5 nm) was observed in the X-ray diffraction pattern of this sample. This sample showed a specific surface area of 860 $m^2$/g, an average pore diameter of 3.4 nm and a water monolayer adsorption of 1.42 $H_2O$ molecules/$nm^2$ specific surface area.

Example 9

An amount (138 g) of No. 3 water-glass ($SiO_2$=29% by weight, $Na_2O$=9.5% by weight) was diluted with 262 g of water and the resultant solution was passed through a column preliminarily packed with an $H^+$-type cation exchange resin (Amberlite IR-120B) to give 400 g of an aqueous solution of active silica. This aqueous active silica solution contained 8.1% by weight of $SiO_2$. An amount (10.9 g) of hexadecylamine was dissolved in 76.8 g of ethanol and then 100 g of the above-described aqueous active silica solution was added thereto under stirring. The obtained mixture had a pH value of 9. Then the mixture was reacted by allowing to stand at room temperature for 22 hours. The complex thus obtained was filtered, washed with water and then dried at 100° C. for 10 hours to give 18.2 g of a white powder. This dry powder was calcinated at 550° C. in the atmosphere for 6 hours to give a white calcinated product. A peak (d=3.98 nm) was observed in the X-ray diffraction pattern of this sample. This sample showed a specific surface area of 870 $m^2$/g, an average pore diameter of 4.3 nm, and a water monolayer adsorption of 1.4 $H_2O$ molecules/$nm^2$ specific surface area.

Example 10

A mixture prepared as in Example 9 was reacted by allowing to stand at room temperature for 22 hours. The complex thus obtained was filtered, washed with water and dried at 100° C. for 10 hours to give a white powder. A 2 g portion of this dry powder was dispersed in 200 ml of ethanol, mixed by stirring at 60° C. for 1 hour and then filtered. After repeating this procedure thrice, the mixture was dried at 100° C. for 3 hours to give 0.8 g of a white powder. This sample showed a specific surface area of 900 $m^2$/g, an average pore diameter of 4.3 nm, and a water monolayer adsorption of 1 .7 $H^2O$ molecules/$nm^2$ specific surface area. After evaporating off the ethanol from the extract, 1.1 g of the hexadecylamine contained as the template in the dry powder was recovered.

Example 11

The mesoporous silica synthesized in Example 1 was ground with a jet mill manufactured by Seisin Enterprise Co., Ltd. to give a sample having an average particle diameter of 2.7 μm (hereinafter referred to as the sample A). This sample A showed a specific surface area of 700 $m^2$/g, a pore volume of 1.6 cc/g and an average pore diameter in the mesopore region of 4.0 nm.

The sample A was mixed with water to give a dispersion having a mesoporous silica concentration of 13.8% by weight. This dispersion was mixed with a 10% by weight aqueous solution of cation PVA and a 10% by weight aqueous solution of silanol-modified PVA to give a slurry having a weight ratio of mesoporous silica:cation PVA:silanol-modified PVA of 6:2:2 and a solid content of 12% by weight. This slurry was applied onto a polyethylene terephthalate sheet (thickness: 100 μm) with a bar coater and dried to give a recording sheet provided with an ink absorbent layer of about 30 μm in thickness. This recording sheet contained about 12 g/$m^2$ of the mesoporous silica.

Example 12

A recording sheet was prepared as in Example 11 but using the sample synthesized in Example 2 as a substitute for the sample A employed in Example 11.

Example 13

A recording sheet was prepared as in Example 11 but using the sample synthesized in Example 8 as a substitute for the sample A employed in Example 11.

Comparative Example 1

A recording sheet was prepared as in Example 11 but using silica gel (Carplex™ 304N, manufactured by Shionogi & Co., Ltd., average particle diameter: 9 μm) as a substitute for the sample A employed in Example 11.

Comparative Example 2

As a recording sheet, use was made of a marketed ink-jet paper (MJOHP1N manufactured by SEIKO EPSON CORPORATION).

The printing characteristics of the samples of Examples 11, 12 and 13 and Comparative Examples 1 and 2 were evaluated in the following manner.

In evaluating the following items (1) to (3), use was made of each recording sheet formed above having been solid-printed in yellow, magenta, cyan, black, green, red and blue by using a marketed ink-jet printer (PM-750C manufactured by SEIKO EPSON CORPORATION). In evaluating the item (4), use was made of each recording sheet formed above having been solid-printed in yellow by using a marketed ink-jet printer (DJ-694C manufactured by Hewlett-Packard, Ltd.).

Optical density was measured by using DM400 manufactured by SCREEN.

(1) Printing performance:

Ink cissing and blurring at borders were evaluated with the naked eye:

○: no blurring; Δ: somewhat blurring;

x: serious blurring.

(2) Ink dryness:

Immediately after printing, a white paper sheet was pressed against the printed part and the extent of ink transfer was judged:

○: no transfer after 60 sec.; Δ: no transfer after 90 sec.; and x: transfer after 90 sec.

(3) Water resistance

A printed recording sheet was immersed in water for 2 minutes and dried. Then the extent of ink blurring and run-off was evaluated with the naked eye:

○: little ink run-off; Δ: moderate ink run-off; and x: serious ink run-off.

(4) Light resistance

A printed recording sheet was irradiated with light corresponding to a spectrophotometeric distribution of AM 1.5 at an irradiation intensity of 100 mW/cm$^2$ from a solar simulator (WXS-50S-1.5 manufactured by WACOM). After irradiating for 60 hours, the optical density was measured and the change ratio was determined.

TABLE 1

Table 1 summarizes the evaluation results.

| | Printing performance | Ink dryness | Water resistance | Light resistance |
|---|---|---|---|---|
| Ex. 11 | ○ | ○ | ○ | −13% |
| Ex. 12 | ○ | ○ | Δ | −14% |
| Ex. 13 | ○ | ○ | Δ | −14% |
| C. Ex. 1 | ○ | ○ | x | −32% |
| C. Ex. 2 | ○ | ○ | ○ | −52% |

Industrial Applicability

The present invention provides mesoporous silica having highly hydrophilic surface compared with the conventional ones and a novel process for synthesizing the mesoporous silica. The mesoporous silica of the invention is superior in the capability of absorbing aqueous solutions, etc. to the conventional ones. Also, the mesoporous silica can be synthesized under mild conditions (for example, room temperature, neutral conditions, etc.) with the use of inexpensive materials. Also, the invention is advantageous in that, for example, the template contained in the complex obtained by the reaction can be easily removed by a solvent without calcination at a high temperature.

A recording sheet containing mesoporous silica can provide printed matters which are free from ink blurs, have a high ink-absorptivity and are excellent in water resistance and light resistance. In particular, one containing mesoporous silica having a monolayer adsorption of water at 25° C. of 1.7 H$_2$O molecules/nm$^2$ specific surface area or more shows an improved water resistance compared with the conventional ones.

What is claimed is:

1. Mesoporous silica characterized by having an average pore diameter in the mesopore region of from 1.5 to 10 nm, a nitrogen adsorption specific surface area determined by the BET method of from 500 to 1400 m$^2$/g and a monolayer adsorption of water at 25° C. of 1.7 H$_2$O molecules/nm$^2$ specific surface area or more.

2. A process for synthesizing mesoporous silica comprising the steps of:

mixing and reacting active silica with a neutral template to synthesize an active silica/neutral template complex; and bringing the active silica/neutral template complex into contact with a solvent to remove the neutral template from said complex;

wherein said mesoporous silica is characterized by having a monolayer adsorption of water at 25° C. of 1.7 H$_2$O molecules/nm$^2$ specific surface area or more.

3. The process for synthesizing mesoporous silica as claimed in claim 2, wherein said neutral template is an amine represented by the following structural formula (1):

$$RNH_2 \qquad (1)$$

wherein R represents an alkyl group having 8 to 20 carbon atoms.

4. The process for synthesizing mesoporous silica as claimed in claim 2, wherein said neutral template is a nonionic surfactant represented by the following structural formula (2):

$$R(OCH_2CH_2)_nOH \qquad (2)$$

wherein R represents an alkyl group having 12 to 20 carbon atoms; and n is from 2 to 30.

5. The process for synthesizing mesoporous silica as claimed in claim 2, wherein said neutral template is an amine oxide represented by the following structural formula (3):

$$R(CH_3)_2NO \qquad (3)$$

wherein R represents an alkyl group having 8 to 20 carbon atoms.

6. The process as claimed in claim 2, wherein said solvent to be used in removing the neutral template is an alcohol.

7. An ink absorbent comprising a mesoporous silica synthesized by using a template, wherein said mesoporous silica is the mesoporous silica as claimed in claim 1.

8. An ink absorbent slurry composed of the ink absorbent as claimed in claim 7 and a solvent.

9. A recording sheet characterized by containing the ink absorbent as claimed in claim 7.

10. An ink absorbent comprising the mesoporous silica as claimed in claim 1.

11. An ink absorbent comprising the mesoporous silica of claim 1, which is synthesized by a process comprising mixing and reacting a silica source with a template to synthesize a silica/template complex.

12. The ink absorbent as claimed in claim 11, wherein said template is a neutral template and said silica/template complex is a silica/neutral template complex.

13. The ink absorbent as claimed in claim 12, wherein said process further comprising removing said neutral template from said silica/neutral template complex.

14. The ink absorbent as claimed in claim 11, wherein said silica is an active silica.

15. The ink absorbent as claimed in claim 12, wherein said neutral template is an amine represented by the following structural formula (1):

$$RNH_2 \tag{1}$$

wherein R represents an alkyl group having 8 to 20 carbon atoms.

16. The ink absorbent as claimed in claim 12, wherein said neutral template is a nonionic surfactant represented by the following structural formula (2):

$$R(OCH_2CH_2)_nOH \tag{2}$$

wherein R represents an alkyl group having 12 to 20 carbon atoms; and n is from 2 to 30.

17. The ink absorbent as claimed in claim 12, wherein said neutral template is an amine oxide represented by the following structural formula (3):

$$R(CH_3)NO \tag{3}$$

wherein R represents an alkyl group having 8 to 20 carbon atoms.

18. The ink absorbent as claimed in claim 13, wherein said neutral template-removing step is carried out by bringing said silica/neutral template complex into contact with a solvent.

19. The ink absorbent as claimed in claim 18, wherein said solvent comprises an alcohol.

20. An ink absorbent slurry comprising the ink absorbent as claimed in claim 10 and a solvent.

21. An ink absorbent slurry comprising the ink absorbent as claimed in claim 11 and a solvent.

22. A recording sheet containing the ink absorbent as claimed in claim 10.

23. A recording sheet containing the ink absorbent as claimed in claim 11.

24. An ink absorbent slurry comprising the ink absorbent as claimed in claim 14 and a solvent.

25. A recording sheet containing the ink absorbent as claimed in claim 14.

26. An ink absorbent comprising mesoporous silica synthesized by the process of claim 2.

27. An ink absorbent slurry comprising the ink absorbent of claim 26 and a solvent.

28. A recording sheet comprising the ink absorbent of claim 26.

29. An ink absorbent slurry comprising the ink absorbent of claim 12 and a solvent.

30. A recording sheet containing the ink absorbent of claim 12.

31. An ink absorbent slurry comprising the ink absorbent of claim 13 and a solvent.

32. A recording sheet containing the ink absorbent of claim 13.

33. An ink absorbent slurry comprising the ink absorbent of claim 15 and a solvent.

34. A recording sheet containing the ink absorbent of claim 15.

35. An ink absorbent slurry comprising the ink absorbent of claim 16 a solvent.

36. A recording sheet containing the ink absorbent of claim 16.

37. An ink absorbent slurry comprising the ink absorbent of claim 17 and a solvent.

38. A recording sheet containing the ink absorbent of claim 17.

39. An ink absorbent slurry comprising the ink absorbent of claim 18 and a solvent.

40. A recording sheet containing the ink absorbent of claim 18.

41. An ink absorbent slurry comprising the ink absorbent of claim 19 and a solvent.

42. A recording sheet containing the ink absorbent of claim 19.

* * * * *